US012481299B2

(12) United States Patent
Gil et al.

(10) Patent No.: US 12,481,299 B2
(45) Date of Patent: Nov. 25, 2025

(54) DIGITAL VOLTAGE REGULATOR INCLUDING MIXED-STACK POWER STAGE

(71) Applicant: Intel Corporation, Santa Clara, CA (US)

(72) Inventors: Lior Gil, Haifa (IL); Kosta Luria, Pardesiya (IL); Michael Zelikson, Haifa (IL)

(73) Assignee: Intel Corporation, Santa Clara, CA (US)

(*) Notice: Subject to any disclaimer, the term of this patent is extended or adjusted under 35 U.S.C. 154(b) by 746 days.

(21) Appl. No.: 17/561,064

(22) Filed: Dec. 23, 2021

(65) Prior Publication Data

US 2023/0205243 A1 Jun. 29, 2023

(51) Int. Cl.
*G05F 1/575* (2006.01)
*G05F 1/565* (2006.01)
*G05F 1/595* (2006.01)

(52) U.S. Cl.
CPC .............. *G05F 1/575* (2013.01); *G05F 1/595* (2013.01)

(58) Field of Classification Search
CPC ........... G05F 1/575; G05F 1/565; G05F 1/595
See application file for complete search history.

(56) References Cited

U.S. PATENT DOCUMENTS 8,169,203 B1 * 5/2012 Vemula .................... G05F 1/575 323/273
10,771,049 B1 * 9/2020 Bhattad .................... H02M 1/08
2015/0286235 A1 * 10/2015 Vahid Far ............... G05F 1/575 323/315
2017/0315574 A1 * 11/2017 Brown ..................... G05F 1/468
2021/0409028 A1 * 12/2021 Shen ........................ H03L 7/095
2023/0152832 A1 * 5/2023 Fort .......................... G05F 1/59 323/265
2023/0199516 A1 * 6/2023 Chance ................ H04B 7/0691 370/329
2024/0213961 A1 * 6/2024 Toroker ................... H03K 5/05

* cited by examiner

*Primary Examiner* — Sisay G Tiku
(74) *Attorney, Agent, or Firm* — NICHOLSON DE VOS WEBSTER & ELLIOTT LLP

(57) ABSTRACT

Some embodiments include an apparatus including a first node in a voltage regulator, a second node in the voltage regulator, and a power stage to receive a first voltage from the first node and provide a second voltage at the second node. The power stage includes a first circuit path and a second circuit path coupled in parallel with each other between the first and second nodes. The first circuit path includes a first number of at least one transistor coupled between the first and second nodes. The second circuit path includes a second number of at least one transistor between the first and second nodes. Wherein the first number is unequal to the second number.

18 Claims, 7 Drawing Sheets

100

700

DIGITAL VOLTAGE REGULATOR INCLUDING MIXED-STACK POWER STAGE

TECHNICAL FIELD

Embodiments described herein pertain to power management in electronic systems. Some embodiments relate to voltage regulators.

BACKGROUND

Voltage regulators are used in many electronic devices or systems, such as computers, tablets, cellular phones, and other electronic items. A voltage regulator can operate to keep an output voltage at an output node to be within target voltage range relative to an input voltage at an input node. The output voltage is often used by a load as supply voltage. A voltage regulator, such as a digital voltage regulator (DVR), usually includes power transistors that can operate as switches between the input and output nodes. These transistors can be turned off or turned on to operate in linear conducting states. The voltage regulator also includes a control unit to monitor and adjust the output voltage. The control unit can adjust the output voltage by controlling the switching of the power transistors. To maximize power efficiency, the voltage regulator is often designed to keep the input voltage as close to the output voltage as possible. The difference between input and output voltages is often called a dropout voltage, which normally has a relatively low value. In certain scenarios, the difference between $V_{IN}$ and $V_{OUT}$ can be relatively high (e.g., high dropout voltage) and load current (e.g., Icc(t)) can drop significantly with respect to a maximum current (e.g., Icc_max) at the output node. In such certain scenarios, the control unit may place a relatively small number of the power transistors in conducting states. As a result, the current draw per conducting transistor can be relatively high, leading to a higher power dissipation in comparison with a full load situation. This can result in severe reliability violations.

DETAILED DESCRIPTION

Many conventional techniques are available to deal with the reliability violations mentioned above. For example, in some conventional techniques, the control unit shuffles the number of conducting transistors in a power stage while keeping the number of conducting transistors relatively low. However, such conventional techniques can lead to excessive power dissipation that degrades power savings obtained by the volage regulator. In some other conventional techniques, a closed loop analog bias is introduced in the voltage regulator. However, such analog loop can significantly complicate the design of the voltage regulator and may lead to potential risks of instability and functional failure.

The techniques described herein involve a digital voltage regulator having a mixed-stack power stage. The described power stage includes a combination of different transistor stacks coupled in parallel between a voltage input node and a voltage output node. The described power stage can have different numbers of series-connected transistors among the stacks. In an example, the described power stage includes a mix of a single stack including a single transistor, a double stack including two series-connected transistors, and a triple stack including three series-connected transistors. The single stack, a double stack, and a triple stack are coupled in parallel with each other between the voltage input and output nodes. In another example, the described power stage can have stacks with more than three series-connected transistors. The described techniques can selectively enable current to flow through any combination of the stacks. Effective power and current densities can be kept within reliability limits with the described techniques. The described power stage can have a relatively lower power penalty, less complex design, and lower performance penalty. Other improvements and benefits are described below with reference to FIG. 1 through FIG. 7.

Figure 1:
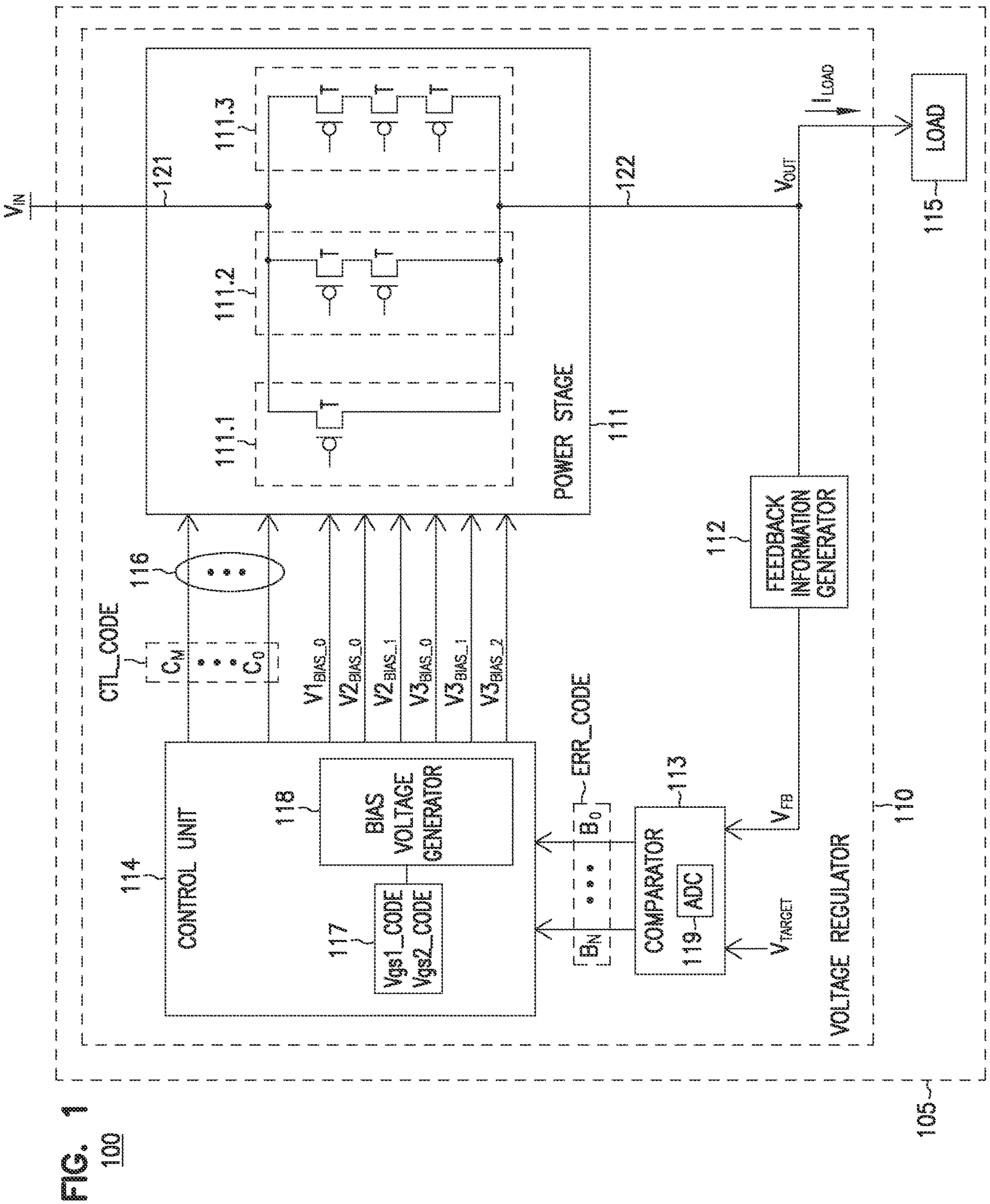
FIG. 1 shows an apparatus including a voltage regulator and a load, according to some embodiments described herein.

FIG. 1 shows an apparatus 100 including a voltage regulator 110 and a load 115, according to some embodiments described herein. Apparatus 100 can include or be included in a system on chip (SoC), a system in a package (SiP), an electronic device or system, such as a computer (e.g., desktop, laptop, or notebook), a tablet, a cellular phone, wearable electronics (e.g., smart watches), or other electronic devices or systems.

As shown in FIG. 1, voltage regulator 110 can include a node (e.g., input supply node) 121 to receive voltage (e.g., input voltage) $V_{IN}$, and a node (e.g., output supply node) 122 to provide a voltage (e.g., output voltage or load supply voltage) $V_{OUT}$. The value of voltage $V_{OUT}$ can be less than the value of voltage $V_{IN}$ by a voltage (e.g., dropout voltage) $V_{DO}$, where $V_{DO}=N_{IN}-V_{OUT}$. The value of voltage $V_{DO}$ can be small (e.g., a low drop-out voltage (LDO)) relative to the values of voltages $V_{IN}$ and $V_{OUT}$, depending on the load operating conditions.

Voltage regulator 110 can include digital components to control (e.g., regulate) the value of voltage $V_{OUT}$, such that voltage regulator 110 can be referred to as a digital voltage regulator e.g., a digital linear voltage regulator (DLVR)). In some structures (e.g., configurations), voltage regulator 110 can be configured to operate with voltages $V_{IN}$ and $V_{OUT}$ having a range between 0V to 2V. However, voltage regulator 110 may be structured to operate at other voltage ranges.

Load 115 may use voltage $V_{OUT}$ as its operating voltage (e.g., regulated supply voltage). Load 115 can include or be included in a processor (e.g., a central processing unit (CPU)), a single processor core, multiple processor cores, an SoC, or other functional (e.g., digital circuits) units or devices.

As shown in FIG. 1, apparatus 100 can include an integrated circuit (IC) die 105 (e.g., an IC chip). IC die 105 can include a semiconductor die (e.g., a silicon die). Voltage regulator 110 and load 115 can be included in (e.g., integrated in, located on or in, formed in, or formed on) die 105. FIG. 1 shows an example where voltage regulator 110 and load 115 are located on the same IC die (e.g., IC die 105). However, load 115 can be outside IC die 105. For example, load 115 can be included in another IC die separated from IC die 105. For example, voltage regulator 110 can be included in one IC die on a circuit board (e.g., motherboard), not shown in FIG. 1, and load 115 can be included in another IC die on the circuit board and coupled to voltage regulator 110 through conductive traces (e.g., copper trances) on the circuit board.

As shown in FIG. 1, voltage regulator 110 can include a power stage 111, a feedback information generator 112, a comparator 113, and a control unit 114. FIG. 1 shows an example where feedback information generator 112 and comparator 113 are outside control unit 114. However, feedback information generator 112, comparator 113, or both can be part of (e.g., located in) control unit 114.

Power stage 111 can include circuit blocks (e.g., circuit units) 111.1, 111.2, and 111.3 having respective transistors T. Each of circuit blocks 111.1, 111.2, and 111.3 can include at least one transistor T (either only one transistor T or series-connected transistors T) coupled between nodes 121 and 122. The number transistors of a stack coupled between nodes 121 and 122 can be an odd number or an even number. FIG. 1 shows transistors T including p-channel field effect (PFET) transistors as an example. However, transistors T can include n-channel field effect (NFET) transistors. FIG. 1 shows an example of three circuit blocks 111.1, 111.2, and 111.3 in power stage 111. However, the number of circuit blocks can be different from three.

As shown in FIG. 1, transistors T can be arranged (e.g., coupled) in a single stack, a double stack, and a triple stack in a respective circuit block. A single stack has a single (only one) transistor T coupled between (e.g., directly coupled to) nodes 121 and 122. A double stack has two transistors T coupled in series between (e.g., directly coupled to) nodes 121 and 122. A triple stack has three transistors coupled in series between (e.g., directly coupled to) nodes 121 and 122. Since power stage 111 has an unequal number of transistors (e.g., one, two, and three) among the stacks, power stage 111 can be called a mixed-stack power stage.

As shown in FIG. 1, transistors of a circuit block circuit (e.g., circuit block 111.1 or 111.2) can be coupled parallel with transistors T of another circuit block (e.g., circuit block 111.3) between nodes 121 and 122. FIG. 1 shows an example where a circuit block (e.g., circuit block 111.3) can include up to three transistors T coupled in series between nodes 121 and 122, However, a circuit block of power stage 111 can include more than three transistors (e.g., at least four transistors T) coupled in series between nodes 121 and 122.

Control unit 114 can operate to generate control information (a digital control code) CTL_CODE, which can include bits $C_0$ through $C_M$ (e.g., M+1 hits, where M is a positive integer) on respective control nodes (or control lines) 116. Control unit 114 can use control information CTL_CODE to control (e.g., selectively turn on or turn off) transistors T of power stage 111. Control information CTL_CODE can include a thermometer code, a binary code, or a combination of thermometer and binary codes. Thus, bits $C_0$ through $C_M$ can include thermometer bits, binary bits, or a combination of thermometer bits and binary bits.

Control unit 114 can include a bias voltage generator 118 (details shown in FIG. 5) to generate different bias voltages $V1_{BIAS\_0}$, $V2_{BIAS\_0}$, $V2_{BIAS\_\_1}$, $V3_{BIAS\_0}$, $V3_{BIAS\_1}$, and $V3_{BIAS\_2}$ (collectively referred to as bias voltages). Control unit 114 can use these bias voltages to bias respective transistors T of power stage 111. The bias voltages can have different values, such that the gate-to-source voltage (Vgs) of transistors T of power stage 111 can have the same (or substantially the same) voltage (e.g., a selected predetermined voltage), as described in detail with reference to FIG. 5.

As shown in FIG. 1, control unit 114 can include a circuit 117 that can include a memory circuit (e.g., fuses) to store bias control codes Vgs1_CODE and Vsg2_CODE, which can have predetermined values (e.g., digital values). The values (analog values) of the bias voltages can be generated in part based on the values (e.g., stored digital values) of bias control codes Vgs1_CODE and $V_B$ g2 CODE. FIG. 1 shows a specific number (e.g., two) of bias control codes (e.g., Vgs1_CODE and Vsg2_CODE) and a specific number (e.g., six) of bias voltages (e.g., $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$). However, the numbers of bias control codes and bias voltages can vary (e.g., depending on the number of transistors T in a stack of power stage 111).

FIG. 1 shows an example where circuit 117 and bias voltage generator 118 are located in control unit 114. However, one or both of circuit 117 and bias voltage generator 118 can be located outside control unit 114 (e.g., located at different locations on IC die 105).

Feedback information generator 112 can operate to generate feedback information (e.g., a feedback voltage) $V_{FB}$. The value of feedback information $V_{FB}$ is based on the value of voltage $V_{OUT}$. For example, the value of feedback information $V_{FB}$ can be equal to the value of voltage $V_{OUT}$ (e.g., $V_{FB}=V_{OUT}$) or can be a fraction of the value of voltage $V_{OUT}$. For example, feedback information $V_{FB}$ can be a fraction of the value of voltage $V_{OUT}$ such that $V_{FB}=x*V_{OUT}$ (x times $V_{OUT}$) where x is a positive number less than one. As an example, feedback information generator 112 can include a resistor ladder (e.g., a voltage divider) such that the value of feedback information $V_{FB}$ can be based on the values of a resistor ratio of resistor ladder circuit and the value of voltage $V_{OUT}$, such that that $V_{FB}=x*V_{OUT}$.

Comparator 113 can operate to compare feedback information $V_{FB}$ with a range (e.g., a predetermined range) of voltages. The range of voltages can be generated based on a target voltage range (e.g., expected operating voltage range) of voltage of $V_{OUT}$. The target voltage range can include a voltage (e.g., a target voltage) $V_{TARGET}$. Comparator 113 can generate information (e.g., an error code) ERR_CODE based on the results of the comparisons. Information ERR_CODE can include bits $B_0$ through $B_N$ (e.g., N+1 bits, where N is a positive integer). Information ERR_CODE and control information CTL_CODE can have the same number of bits (e.g., N=M) or different number of bits (e.g., N≠M). Information ERR_CODE can include a thermometer code, such that bits $B_0$ through $B_n$ can include thermometer bits. Alternatively, information ERR_CODE can include a binary code, such that bits $B_0$ through $B_N$ can include binary bits. In an example, comparator 113 can include an analog-to-digital converter (ADC) 119. ADC 119 can include a flash ADC to provide information ERR_CODE based on comparisons between feedback information $V_{FB}$ and a range of voltages (e.g., from a resistor ladder) in ADC 119.

In the above description, feedback information $V_{FB}$ can be in the form of a voltage (e.g., voltage signal). However, the feedback information can be in the form of a current. For example, voltage regulator 110 may monitor (e.g., sense) current (e.g., $I_{LOAD}$) at node 122 and generate a feedback information based on the sensed current. In this example, control information CTL_CODE can be generated based on the sensed current. In general, feedback information can be implemented in a form of any physical entity (e.g., frequency, in addition to the feedback information described above) that features bijective relationship with the desired output state definition.

Control unit 114 can adjust (e.g., increase, decrease, or keep the same) the value of control information CTL_CODE based on feedback information $V_{FB}$. Control unit 114 adjusts the value of control information CTL_CODE so that voltage $V_{OUT}$ can be maintained within a target voltage range during operation of load 115.

In operation, voltage regulator 110 can use control information CNTL_CODES to adjust (e.g., change) the percentage of transistors T that are conducting to maintain the effective resistance $R_{EEF}$ between nodes 121 and 122 of the power stage 111 to comply with the Kirchhoff law: $V_{IN}-(I_{LOAD}*R_{EFF})=V_{OUT}$. Voltage regulator 110 can enable current to flow through any combination of the stacks in circuit blocks 111.1, 111.2, and 111.3. This allows voltage regulator 110 to keep effective power and current densities within reliable limits. Further, power stage 111 can have a relatively lower power penalty, less complex design, and lower performance penalty.

Figure 2:
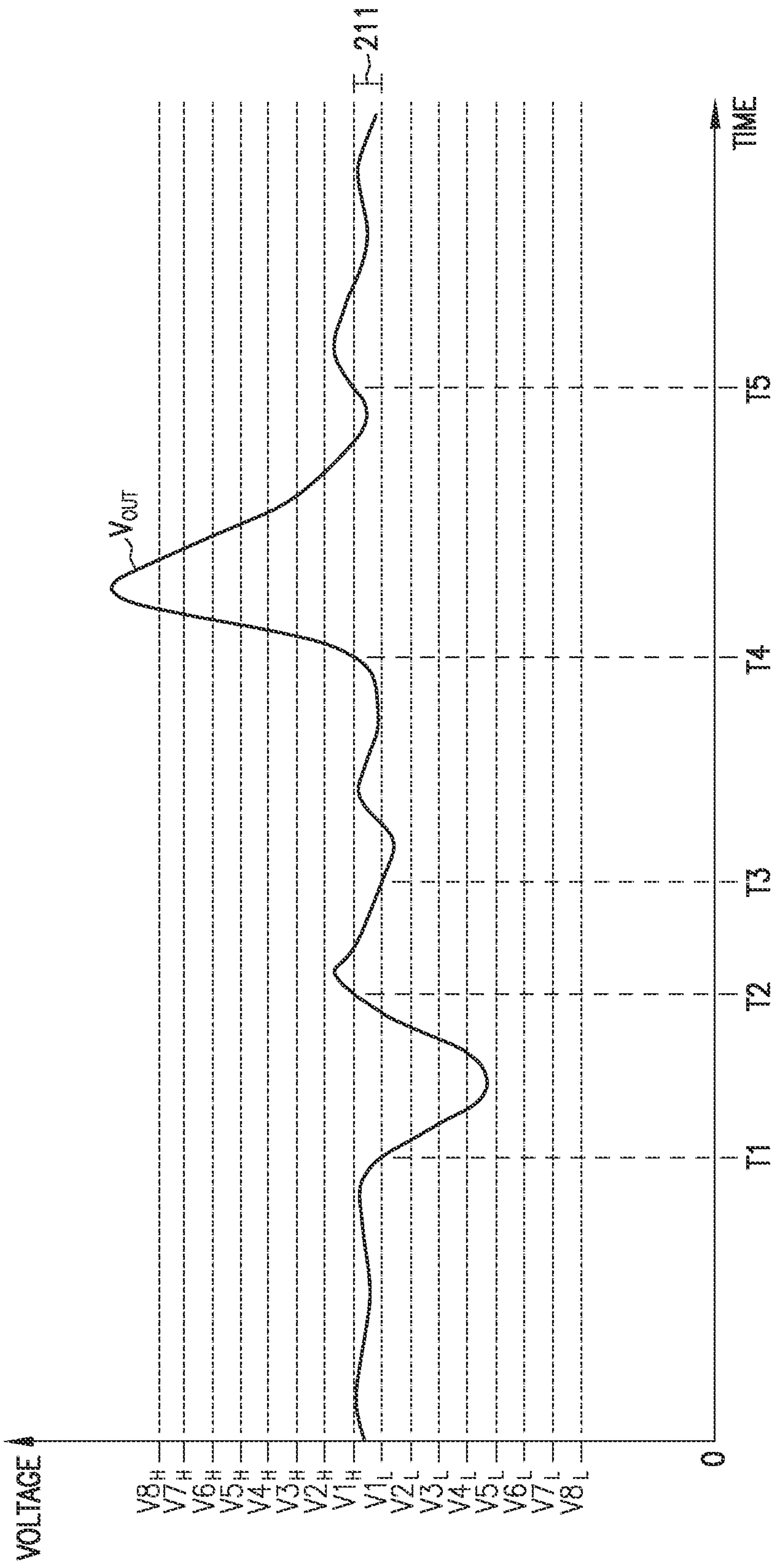
FIG. 2 shows example waveforms of an output voltage provided by the voltage regulator of FIG. 1, according to some embodiments described herein.

FIG. 2 shows an example waveform of voltage $V_{OUT}$ during an operation of voltage regulator 110 and load 115, according to some embodiments described herein. Voltage regulator 110 (FIG. 1) can operate to keep voltage $V_{OUT}$ as close as possible to voltage $V_{TARGET}$ and within a target voltage range 211. In FIG. 2, voltages $V1_L$ through $V8_L$ represent lower thresholds (e.g., less than voltage $V_{TARGET}$). Voltages $V1_H$ through $V8_H$ represent upper thresholds (e.g., greater than voltage $V_{TARGET}$). Target voltage range 211 can be between one of voltages $V1_L$ through $V8_L$ and one of voltages $V1_H$ through $V8_H$. FIG. 2 shows an example where target voltage range 211 is between voltages $V1_L$ and $V1_H$.

In operation, voltage regulator 110 (FIG. 1) can operate to pull voltage $V_{OUT}$ back in target voltage range 211 (FIG. 2) if voltage $V_{OUT}$ is outside target voltage range 211 (e.g., $V_{OUT}<V1_L$, or $V_{OUT}>V1_H$). For example, when voltage $V_{OUT}$ is less than voltage $V1_L$ (e.g., at time T1 or T3 in FIG. 2), control unit 114 (FIG. 1) can adjust (e.g., increase) the value of control information CTL_CODE to pull voltage $V_{OUT}$ back in target voltage range 211. The adjustment amount applied to the value (e.g., present value) of control information CTL_CODE can depend on the value (e.g., position) of voltage $V_{OUT}$ relative to the values (e.g., positions) of voltages $V1_L$ through $V8_L$. For example, the farther voltage $V_{OUT}$ from voltage $V1_L$ (in the direction from voltage $V1_L$ to voltage $V8_L$ in FIG. 2), the larger the adjustment amount (e.g., larger increased amount). The closer voltage $V_{OUT}$ from voltage $V1_L$, the smaller the adjustment amount (e.g., smaller increased amount). In this example, control unit 114 can perform at least one adjustment (e.g., only one adjustment or more than one adjustment) to adjust (e.g., increase) the value of control information CTL_CODE until voltage $V_{OUT}$ within target voltage range 211.

In another example, when $V_{OUT}$ is greater than voltages $V1_H$ (e.g., at time T2, T4, or T5 in FIG. 2), control unit 114 can adjust (e.g., decrease) the value of control information CTL_CODE to pull voltage $V_{OUT}$ our back in target voltage range 211. In this example, the adjustment amount applied to the value of control information CTL_CODE can depend on the value (e.g., position) of voltage $V_{OUT}$ relative to the values of voltages $V1_H$ through $V8_H$. For example, the farther voltage $V_{OUT}$ from voltage $V1_H$ (in the direction from voltage $V1_H$ to voltage $V8_H$) the larger the adjustment amount (e.g., larger decreased amount). The closer voltage $V_{OUT}$ from voltage $V1_L$ the smaller the adjustment amount (e.g., smaller decreased amount). In this example, control unit 114 can perform one or more adjustment to adjust (e.g., decrease) the value of control information CTL_CODE until voltage $V_{OUT}$ within target voltage range 211.

In an example, an ADC (e.g., ADC 119 in FIG. 1) can be used to determine (e.g., compare) the value (e.g., position) of voltage $V_{OUT}$ relative to the values (e.g., positions) of voltages $V1_L$ through $V8_L$ and voltages $V1_H$ through $V8_H$ (FIG. 2). The ADC can generate a resulting digital output based on the position of voltage $V_{OUT}$. Comparator 113 (FIG. 1) can generate information (e.g., an error code) ERR_CODE based on the resulting digital output. Control unit 114 can adjust (e.g., increase or decrease) the value of control information CTL_CODE (as described above) based on information ERR_CODE to keep voltage $V_{OUT}$ within target voltage range 211.

Figure 3:
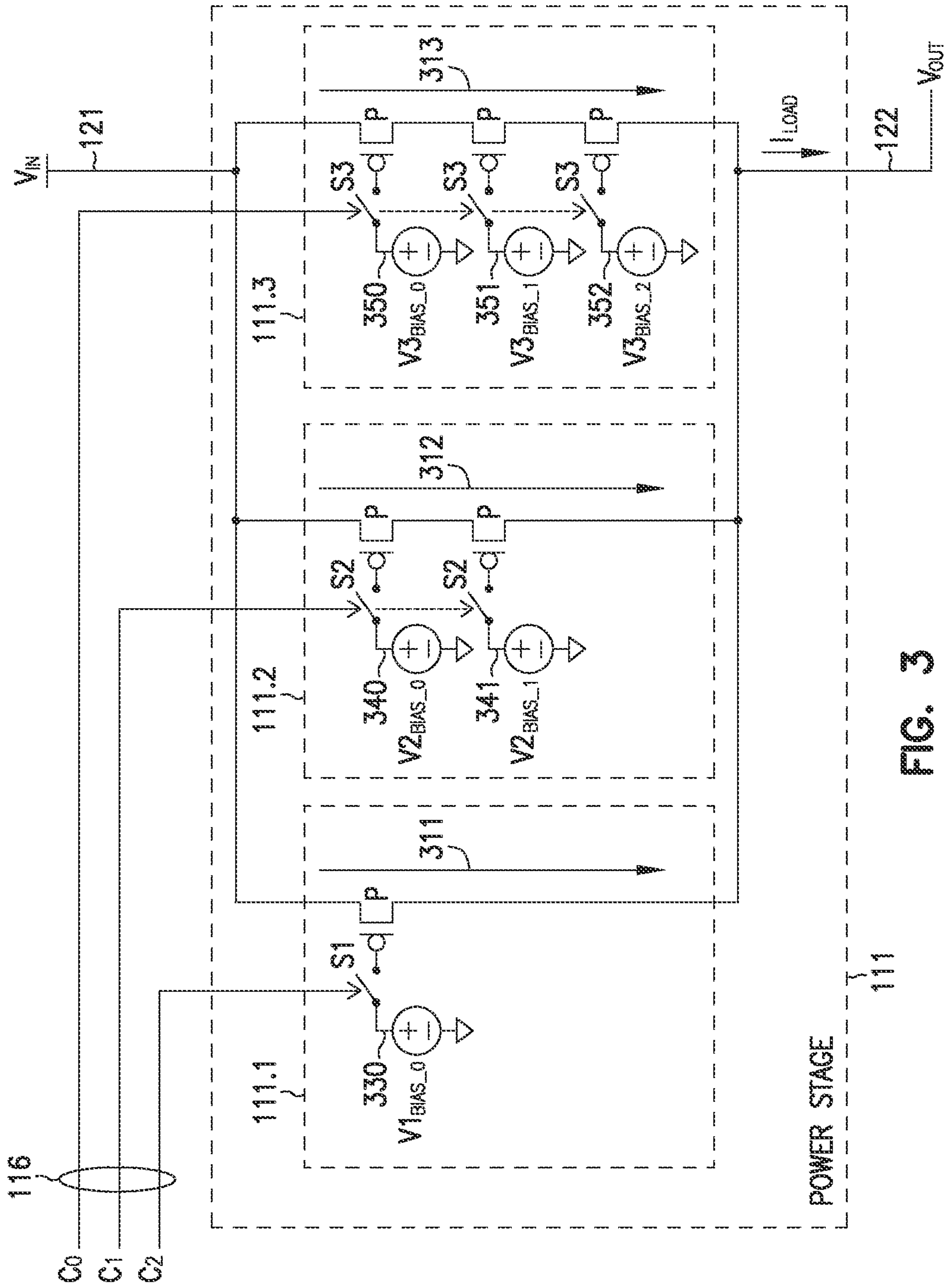
FIG. 3 shows a power stage of the voltage regulator of FIG. 1 including mixed stacks of transistors, according to some embodiments described herein.

FIG. 3 shows power stage 111 including single, double, and triple stack structures and bias circuits, according to some embodiments described herein. FIG. 3 shows power stage 111 having three circuit blocks (e.g., circuit units) 111.1, 111.2, and 111.3, as an example. However, power stage 111 can have more than three circuit blocks.

As shown in FIG. 3, circuit blocks (e.g., circuit units) 111.1, 111.2, and 111.3 can include circuit path 311, 312, and 313, respectively, that are coupled in parallel with each other between nodes 121 and 122. Each of circuit paths 311, 312, and 313 can include at least one transistor coupled between nodes 121 and 122. For example, circuit path 311 includes a single transistor T coupled between nodes 121 and 122. Circuit path 312 includes two transistors T coupled in series between nodes 121 and 122. Circuit path 311 includes three transistors T coupled between in series between nodes 121 and 122.

As shown in FIG. 3, power stage 111 can have switches S1, S2, and S3 in respective stacks of circuit blocks 111.1, 111.2, and 111.3. Switches S1, S2, and S3 can be controlled (e.g., can be turned on or turned oft) by respective bits (e.g., bits $C_0$, $C_1$, and $C_2$) on respective control nodes (e.g., control lines) 116.

FIG. 3 shows an example where switches S2 of circuit block 111.2 are controlled by the same information (e.g., by the same bit $C_1$ of control information CTL_CODE) on nodes (or control lines) 116. However, different switches S2 of circuit block 111.2 can be controlled by different control information of voltage regulator 110 (FIG. 1). For example, switch S2 coupled to node 340 can be controlled by bit $C_1$ (as shown in FIG. 3). However, switch S2 coupled to node 341 can be controlled by control information (e.g., by a bit, not shown in FIG. 3) different from bit $C_1$ of control information CTL_CODE on nodes 116.

Like switches S2, FIG. 3 shows an example where switches S3 of circuit block 111.3 are controlled by the same information (e.g., by the same bit $C_0$ of control information CTL_CODE) on nodes 116. However, different switches S3 of circuit block 111.3 can be controlled by different control information of voltage regulator 110. For example, switch S3 coupled to node 350 can be controlled by bit $C_0$ (as shown in FIG. 3). However, switches S3 coupled to respective nodes 351 and 352 can be controlled by control information (e.g., not shown in FIG. 3) different from bit $C_0$ of control information CTL_CODE on nodes 116. The control information (not shown in FIG. 3) that controls switches S3 coupled to respective nodes 351 and 352 can be the same (e.g., same bit) or can be different (e.g., different bits). Thus, in the description herein, the switches coupled to transistors T of power stage 111 (e.g., FIG. 3, FIG. 4, and FIG. 6) can be controlled by the same control information or different controlled information. Further, any multiple (e.g., two or more) of switches in the same stack (e.g., any two switches S3 in the same stack) can be controlled by the same control information.

In FIG. 3, a stack (single, double, or triple) is in a conducting state when the respective switch (e.g., switch S1, S2, or S3) in that stack is turned on (e.g., turned on based on the value of the respective bit of control information CTL_CODE). Transistors T of a conducting stack can be turned on and become conducting transistors (active transistor or turned-on transistors). The conducting transistors in a stack can form part of a current path between nodes 121 and 122 through the conducting transistors of that stack. A stack (single, double, or triple) is not in a conducting state (non-conducting state) when the respective switch in that stack is turned off (e.g., turned off based on the value of the respective bit of control information CTL_CODE). Transistors T of a non-conducting stack are turned off and become non-conducting transistors. A current path between nodes 121 and 122 is not formed through the non-conducting transistors. One or more of the stacks of circuit blocks 111.1, 111.2, and 111.3 can be selectively placed in a conducting state. The rest of the stacks can be placed in (or can remain in) a non-conducting state, depending on operating conditions of load 115 (FIG. 1).

As shown in FIG. 3, bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$ (generated by bias voltage generator 118 in FIG. 1) can be provided to (e.g., applied at) nodes 330, 340, 341, 350, 351, and 352, respectively. Each of voltages $V1_{BIAS\_0}$, $V2_{BIAS\_0}$, $V2_{BIAS\_1}$, $V3_{BIAS\_\_0}$, $V3_{BIAS\_1}$, and $V3_{BIAS\_2}$ can have a value greater than zero (e.g., a non-ground value). Thus, nodes 330, 340, 341, 350, 351, and 352 are non-ground nodes (not directly coupled to ground). The reason for biasing transistors T with non-ground voltages (e.g., bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$) is to keep effective resistance of a multi-stack structure (e.g., double stack or triple stack) equal to that of a single transistor T, as discussed below.

As described above, FIG. 1 and FIG. 3 show an example of three circuit blocks 111.1, 111.2, and 111.3 where each circuit block includes one stack (e.g., a single stack, a double stack, or a triple stack). However, power stage 111 can logically include $2^n$ circuit blocks (e.g., $2^n$ circuit units). In operation, the stacks of transistors in all of the $2^n$ circuit blocks (or alternatively, in fewer than all of the $2^n$ circuit blocks) can be set in either a conducting state or a non-conducting state. The state of the stacks each circuit block, which contributes to the overall effective resistance (e.g., resistance across the circuit block between nodes 121 and 122) of power stage 111, can be determined by the number of the control lines (e.g., n control lines for control $2^n$ circuit blocks). The number of n control lines are used as an example. However, the number of control lines (e.g., wires) can depend on the coding scheme of voltage regulator 110 (FIG. 1), as calculated by control unit 114. Thus, in some structures and figurations of voltage regulator 110, the number of control lines may be different from n (e.g., less than n or greater than n) for $2^n$ circuit blocks.

The physical structure of power stage 111 can include a mosaic of circuit blocks (elementary units) arranged and connected in a way that maximizes uniformity (over the area of power stage 111) of switching activity. Each of circuit blocks 111.1, 111.2, and 111.3 can include a densely packed multi-stack of transistors T of various heights (e.g., single, double, and triple stacks). Again, although FIG. 1 and FIG. 3 (and other figures described herein) refer to a combination of single, double, and triple stack structures, the techniques described herein are applicable to any combination of multi-stack transistors arrangement.

In the structure of power stage 111 (FIG. 3), control unit 114 can dynamically change the effective resistance of power stage 111 to keep voltage $V_{OUT}$ equal (as close as possible) to the target voltage (e.g., $V_{TARGET}$). For example, control unit 114 can selectively turn on or turn off the respective transistors T (based on control information CTL-_CODE) in circuit blocks (e.g., circuit blocks 111.1, 111.2, and 111.3) of power stage 111 to change the effective resistance of power stage 111.

To avoid dependency of calculation algorithm of control unit 114 on dropout voltage $V_{DO}$ and the load (e.g., load 115 in FIG. 1), the circuit blocks (e.g., circuit blocks 111.1, 111.2, and 111.3 in FIG. 3) of power stage 111 can be structured such that conducting transistors T can have the same resistance (e.g., ON-resistance $R_{ON}$) regardless of the height (e.g., single, double, or triple transistors) of the stack that includes the conducting transistors. To achieve an equal $R_{ON}$ resistance, voltage regulator 110 can be configured based on the following two features:

1) Keeping the effective size ($Z_{tot\_eff}$) of a multi-stack structure in a circuit block equal to that of a single transistor (e.g., single PFET) $Z_{PFET}$. This condition yields that the physical size ($Z_{tot\_phys}$) of a circuit block having s stacks is $S^2Z_{PFET}$ (or approximately $s^2Z_{PFET}$).

2) To ensure that the effective resistance of a multi-stack structure equals that of a single transistor, voltage and stack height-dependent bias voltages (analog bias) can be applied to individual transistor T of a circuit block. Example of the bias voltages include bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$ generated by bias voltage generator 118 (FIG. 1).

Figure 4:
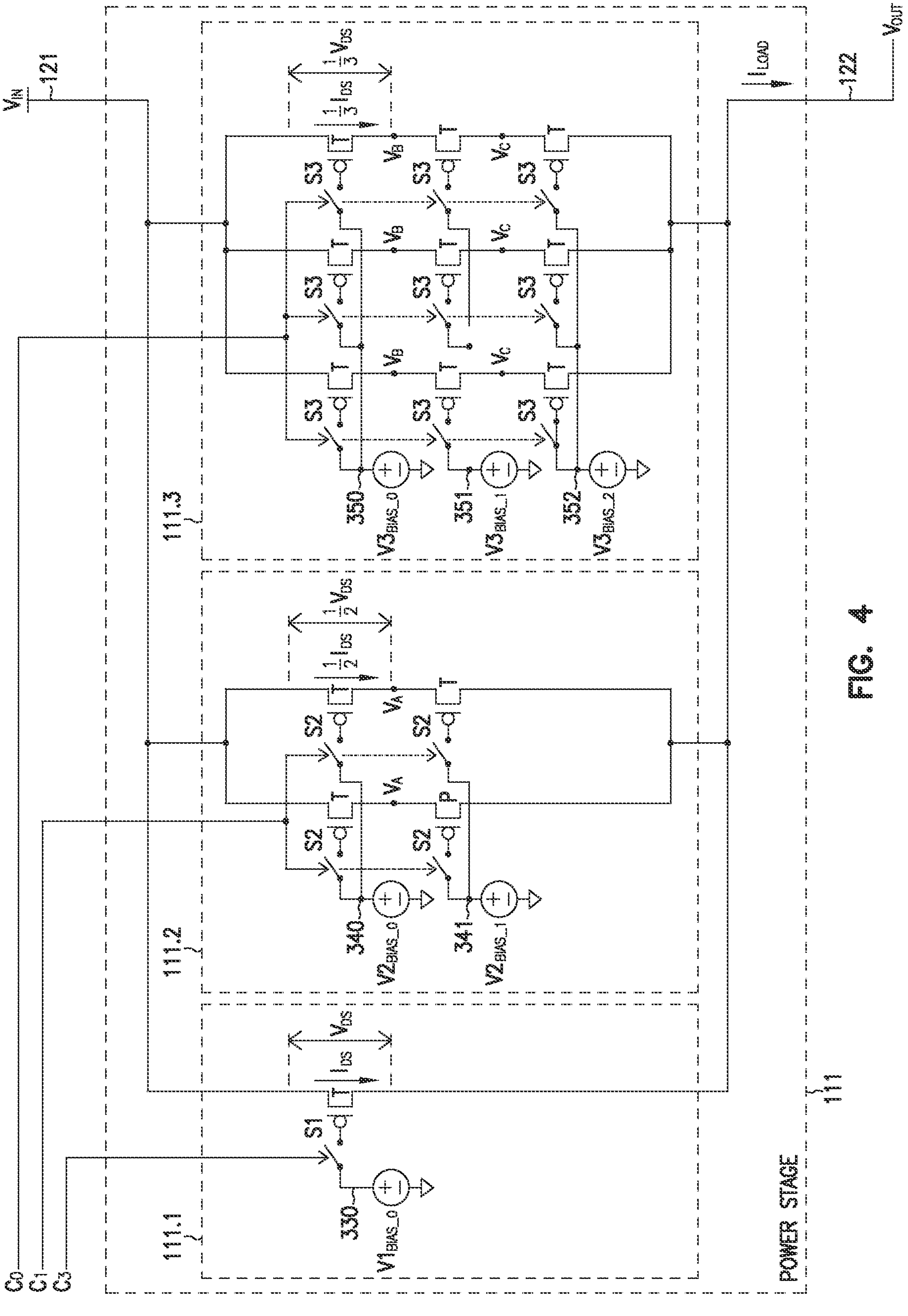
FIG. 4 shows more structures of the power stage of FIG. 1 and FIG. 3, according to some embodiments described herein.

FIG. 4 shows power stage 111 including circuit blocks 111.1, 111.2, and 111.3 having a multi-stack structure (multiple stacks), according to some embodiments described herein. As shown in FIG. 4, circuit block 111.3 can include three stacks (e.g., s=3 and $s^2$=a total of nine transistors T) where each stack can have three transistors T coupled in series between nodes 121 and 122. Thus, the number of transistors T in circuit block 111.3 is $s^2=3^2=9$, where s=3 is the number of stacks of circuit block 111.3.

Circuit block 111.2 can include two stacks where each stack can have two transistors T coupled in series between nodes 121 and 122. Thus, as shown in FIG. 4, the number of transistors T in circuit block 111.2 is $s^2=2^2=4$, where s=2 is the number of stacks of circuit block 111.2.

Circuit block 111.1 can include a single stack (a total of one transistor T) having a single transistor T coupled between nodes 121 and 122. As shown in FIG. 4, the stacks of respective circuit blocks 111.1, 111.2, and 111.3 includes transistors T coupled parallel between nodes 121 and 122.

As mentioned above, under high dropout and low supply current (e.g., low $I_{LOAD}$) conditions, the number of conducting transistors in a conventional voltage regulator can be relatively low. This can result in unacceptably high power and current densities. In power stage 111, to ensure lowest possible resistance under high-load conditions, control information CTL_CODE can be used such that selected bits among the bits of control information CTL_CODE can be used to control the switching of transistors T of circuit blocks (e.g., circuit blocks 111.2 or 111.3) that include multiple stacks, and other bits can be used to control the switching of transistors of the circuit blocks (e.g., circuit block 111.1) that include a single stack. For example, control information CTL_CODE can include least significant bits LSBs and most-significant bits MSBs. One or more of the MSBs can be used to control switch S1 of circuit block 111.1 while one or more of the LSBs can be used to control switches S3 of circuit block 111.3. Selected bits between the MSBs and LSBs can be used to control switches S2 circuit blocks 111.2.

As shown in FIG. 4, due to the dedicated analog biasing of transistors T, the drain-to-source voltage $V_{DS}$ of each transistor in a stack having X transistors is equal to $V_{DO}/X$ ($V_{DO}$ divided by X) where X is the number of transistors T coupled in series between nodes 121 and 122 in a stack. For example, in circuit block 111.1 where each stack includes one transistors T (X=1) coupled in series between nodes 121 and 122, $V_{DS}=V_{DO}$) for transistor T in circuit block 111.1. In another example, in circuit block 111.2 where each stack includes two transistors T (X=2) coupled in series between nodes 121 and 122, $V_{DS}=V_{DO}$ for each transistor T in a stack of circuit block 111.2. In another example, in circuit block 111.3 where each stack include two transistors T (X=3) coupled in series between nodes 121 and 122, $V_{DS}=V_{DO}/3$ for each transistor T in a stack of circuit block 111.2

In a multi-stack configuration of power stage 111 of FIG. 4, both current and power dissipation density are lower (reduced), with respect to single stack (single transistor T) structure of circuit block 111.1. For example, as shown in FIG. 4, in circuit block 111.1, the current through transistor T is $I_{DS}$ and transistor T has voltage $V_{DS}$ (where $V_{DS}=V_{DO}$) for the single stack of circuit block 111.1), Thus, the power consumption (P) of transistor T in circuit block is $P=I_{DS}*V_{DS}$.

However, the current through transistor T of circuit blocks 111.2 and 111.3 is lower than that of circuit block 111.1. In circuit block 111.2, since each stack has two series-connected transistors T, each transistor T in circuit block 111.2 has a lower current (e.g., ½ $I_{DS}$, as shown in FIG. 4) and a lower drain-to-source voltage (e.g., ½ $V_{DS}$, as shown in FIG. 4) in comparison with $I_{DS}$ and $V_{DS}$, respectively, of transistor T of circuit block 111.1. Thus, the power consumption ($P=½\ I_{DS}*½\ V_{DS}=¼\ *V_{DS}$) of a transistor T of circuit block 111.2 is also lower than the power consumption ($P=I_{DS}*V_{DS}$) of transistor T of circuit block 111.1.

In circuit block 111.3, since each stack in circuit block 111.3 has three series-connected transistors T, each transistor T circuit block 111.3 has lower current (e.g., ⅓ $I_{DS}$, as shown in FIG. 4) and lower drain-to-source voltage (e.g., ⅓ $V_{DS}$, as shown in FIG. 4) in comparison with $I_{DS}$ and $V_{DS}$ of transistor T of circuit block 111.1. Thus, the power consumption ($P=⅓\ I_{DS}*⅓\ V_{DS}=\frac{1}{9}\ I_{DS}*V_{DS}$) of a transistor T of circuit block 111.3 is also lower than the power consumption ($P=I_{DS}*V_{DS}$) of transistor T of circuit block 111.1.

FIG. 4 also shows voltages $V_A$, $V_B$, and $V_C$ at respective nodes between transistors T of circuit blocks 111.2 and 111.3. Voltages $V_A$, $V_B$, and $V_C$ can be used as reference voltages for respective bias voltages applied to the gates of respective transistors T in circuit blocks 111.2 and 111.3. As described below with reference to FIG. 5, bias voltage generator 118 can generate corresponding (e.g., matching) voltages $V_A$, $V_B$, and $V_C$. Then, bias voltage generator 118 can use voltages $V_A$, $V_B$, and $V_C$ as respective reference voltages to generate bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$ for transistors T (FIG. 4).

Figure 5:
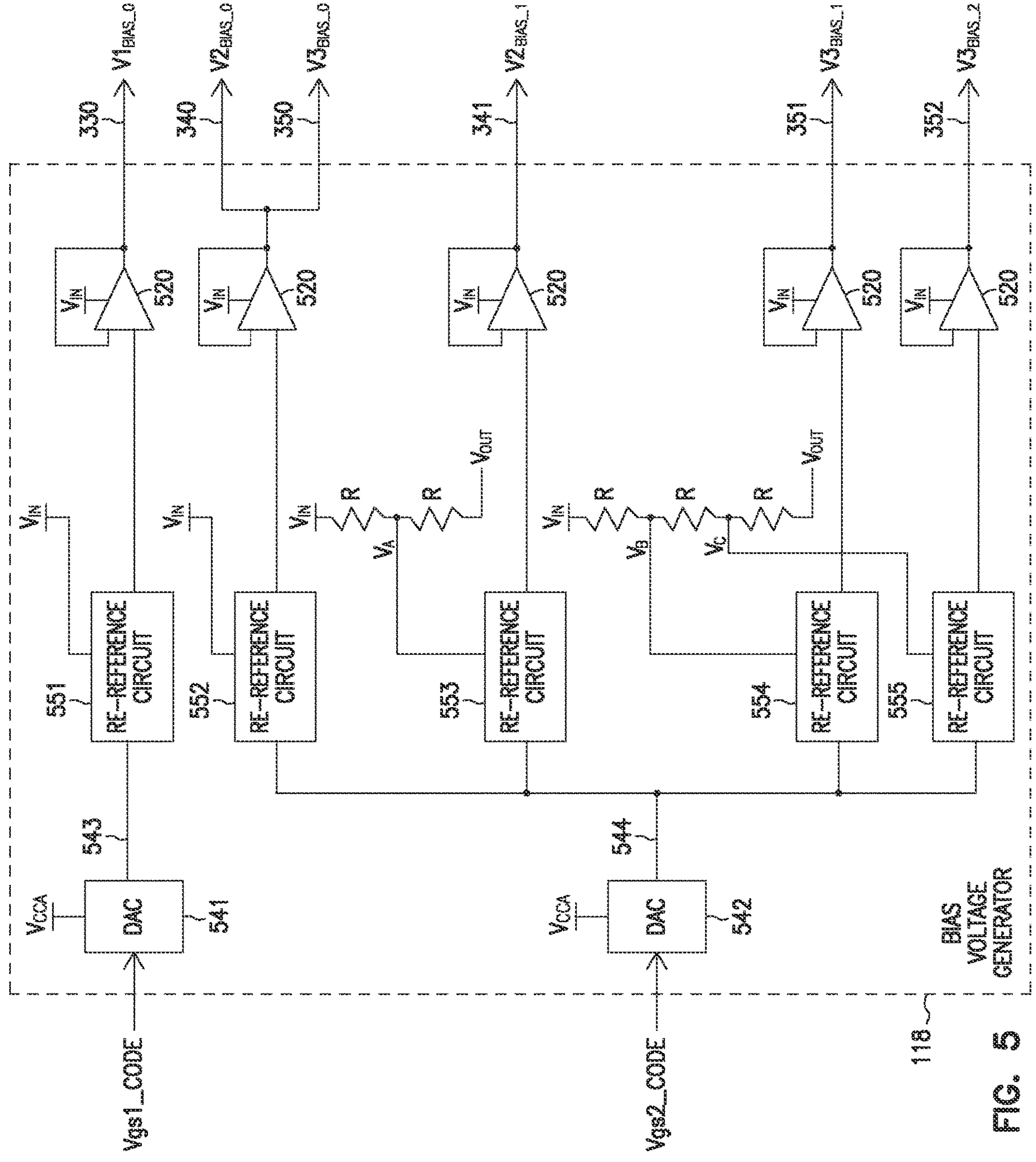
FIG. 5 shows a bias voltage generator to generate bias voltages for the transistors of the power stage of FIG. 4, according to some embodiments described herein.

FIG. 5 shows bias voltage generator 118 for transistors T of power stage 111 of FIG. 3 and FIG. 4, according to sonic embodiments described herein. BIAS voltage generator 118 can include digital-to-analog converters (DACs) 541 and 542, re-reference circuits 551, 552, 553, 554, and 555, resistors R forming respective voltage dividers based on voltage $V_{IN}$ and $V_{OUT}$, unity gain buffers 520, and outputs (e.g., output nodes) to provide bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$ at nodes 330, 340, 350, 341, 351, and 352, respectively. Nodes 330, 340, 350, 341, 351, and 352 are the same as those shown in FIG. 3 and FIG. 4. In FIG. 5, voltage $V_{CCA}$ can be an analog supply voltage for DACs 541 and 542. Voltages $V_{IN}$ and $V_{OUT}$ are the same as those shown in FIG. 1, FIG. 3, and FIG. 4, In FIG. 5, bias voltage generator 118 can be structured (e.g., configured) to operate in a biasing scheme such that the transistors T can have the same gate-to-source voltage (Vgs) and such that voltage Vgs of transistors T can be $(V_{IN}-V_{OUT})/X$, where X is the stack height, which is the number of series-connected transistors in a stack of a respective circuit blocks (e.g., circuit blocks 111.1, 111.2, and 111.3). As an example, in FIGS. 4, X=1, 2, and 3, which are the number of transistors T in a stack between nodes 121 and 122 of circuit blocks 111.1, 111.2, and 111.3, respectively.

The value (analog value) of voltage Vgs of transistors T of power stage 111 (FIG. 3 and FIG. 4) can be predetermined (e.g., can be tuned during design of power stage 111) in a way such that the resulting resistance $R_{ON}$ (resistance of conducting transistors T) is independent of the speed of transistors T. The value of voltage Vgs can be translated into a digital code, which can be stored in circuit 117 (FIG. 1) as bias control codes (e.g., bias control codes Vgs1_CODE and Vgs2_CODE).

In operation, DACs 541 and 542 can receive bias control codes Vgs1_CODE and Vgs2_CODE, respectively, and generate respective analog voltages at respective outputs 543 and 544 based on bias control codes Vgs1_CODE and Vsg2_CODE.

Re-reference circuits 551, 552, 553, 554, and 555 can operate to re-reference analog voltages from outputs 543 and 544 of DACs 541 and 542, respectively. The re-reference operation is performed so that bias voltages $V1_{BIAS\_0}$, $V2_{BIAS\_0}$, $V2_{BIAS\_1}$, $V3_{BIAS\_0}$, $V3_{BIAS\_1}$, and $V3_{BIAS\_2}$ (provided to the gates of respective transistors T in FIG. 4) can cause voltage Vgs of transistors to have the same value (an equal value) and voltage Vgs of transistors T can be $(V_{IN}-V_{OUT})/X$, where X is the stack height, as mentioned above.

For example, in FIG. 5, re-reference circuits 551 can operate such that the voltage at output 543 of DAC 541 can be re-referenced to voltage $V_{IN}$ to generate voltages $V1_{BIAS\_0}$. Re-reference circuit 552 can operate such that the voltage at output 544 of DAC 542 can be re-referenced to voltage $V_{IN}$ to generate voltage $V2_{BIAS\_0}$ and voltages $V3_{BIAS\_0}$ that can be the same bias voltage. Thus, nodes 340 and 350 (in FIG. 3, FIG. 4, and FIG. 5) can be the same node (e.g., can be coupled to each other).

Re-reference circuits 553 can operate such that the voltage at output 544 of DAC 542 can be re-referenced to a voltage $V_A$, where $V_A=(V_{IN}-V_{OUT})/2$, to generate voltage $V2_{BIAS\_1}$.

Re-reference circuits 554 can operate such that the voltage at output 544 of DAC 542 can be re-referenced to a voltage $V_B$, where $V_B=2*(V_{IN}-V_{OUT})/3$, to generate voltage $V3_{BIAS\_1}$.

Re-reference circuits 555 can operate such that the voltage at output 544 of DAC 542 can be re-referenced to a voltage $V_C$, where $V_C=(V_{IN}-V_{OUT})/3$, to generate voltage $V3_{BIAS\_2}$.

As mentioned above, power stage 111 (FIG. 1, FIG. 3, and FIG. 4) can include NFETs (instead of PFETs) in an alternative structure. In such an alternative structure, bias voltage generator 118 of FIG. 5 can be configured to perform the re-reference operation based on voltage $V_{OUT}$ and a voltage $V_{SS}$ (instead of voltages $V_{IN}$ and $V_{OUT}$) where voltage $V_{SS}$ can be zero volts (e.g., ground potential).

Figure 6:
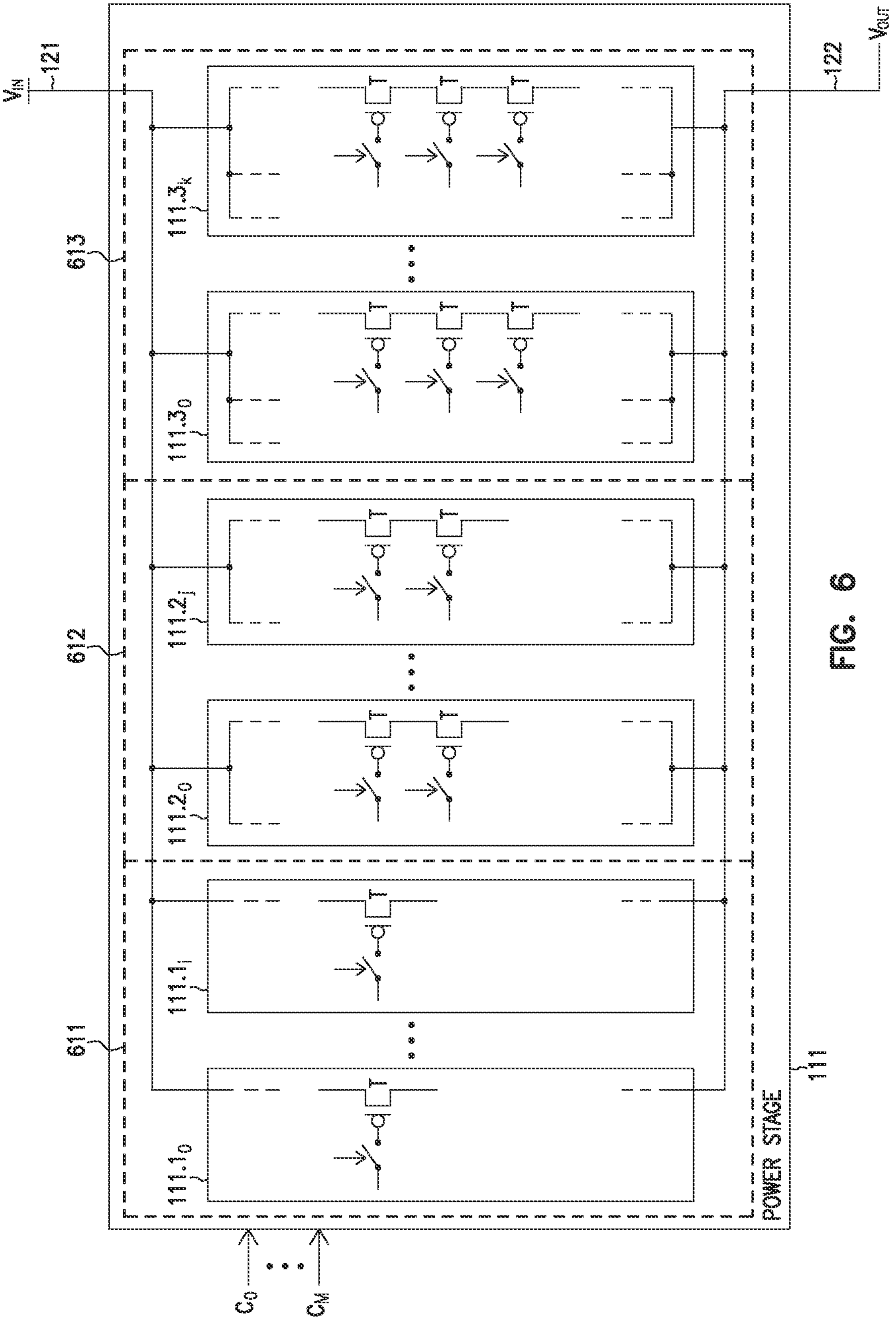
FIG. 6 shows an example of the power stage of FIG. 1 having multiple circuit blocks of a single stack, multiple circuit blocks of double stacks, and multiple circuit blocks of triple stacks, according to some embodiments described herein.

FIG. 6 shows power stage 111 of FIG. 1 having multiple circuit blocks 111.1$_0$ through 111.1$_i$ of parallel single stack, multiple circuit blocks 111.2$_0$ through 111.2$_j$ of double parallel stacks, and multiple circuit blocks 111.3$_0$ through 111.3$_k$ of parallel triple stacks, according to some embodiments described herein. The number of single-stack circuit blocks (e.g., circuit blocks 111.1$_0$ through 111.1$_i$) can be the same or different (unequal) from one or both of the number of double-stack circuit blocks (e.g., circuit blocks 111.2$_0$ through 111.2$_j$) and the number of triple-stack circuit blocks (e.g., circuit blocks 111.3$_0$ through 111.3$_k$). Thus, i, j, and k can have the same value or different values.

For simplicity, FIG. 6 omits some of stacks of transistors T and their connections to nodes 121 and 122. However, each of circuit blocks 111.1$_0$ through 111.1$_i$ can be the same as circuit block 111.1 of FIG. 4. Each of circuit blocks 111.2$_0$ through 111.2$_j$ can be the same as circuit block 111.2 of FIG. 4. Each of circuit blocks 111.3$_0$ through 111.3$_k$ can be the same as circuit block 111.3 of FIG. 4.

In FIG. 6, bits $C_0$ through $C_M$ of control information CTL_CODE (FIG. 1) can be used to control switches of respective circuit blocks of power stage 111. As an example, bits $C_0$ through $C_M$ can be generated based on 8 control bits <0:7> from control unit 114. In an example, for power and routing complexity optimization, MSBs (bits <7:4>) can be translated into a thermometer code (e.g., 15 thermometer bits) and LSBs (bits<3:0>) can be left as a binary code (e.g., four binary bits). Thus, in this example, bits $C_0$ through $C_M$ in FIG. 6 can include 19 bits. In this example, circuit blocks 111.1$_0$ through 111.1$_i$, 111.2$_0$ through 111.2$_j$, and 111.3$_0$ through 111.3$_k$ can include 19 circuit blocks. Each of bits $C_0$ through $C_M$ (one of 19 bits) can be used to control the switching of a corresponding circuit block among circuit blocks 111.1$_0$ through 111.1$_i$, 111.2$_0$ through 111.2$_j$, and 111.3$_0$ through 111.3$_k$.

Digital voltage regulator (e.g., a DLVR) operations often imply that the higher the dropout (e.g., higher $V_{DO}$) and the lower the current (e.g., current $I_{LOAN}$), the smaller the number of conducting power transistors and the lower the value of the control code. The lower the value of the control code, the more challenging it is to maintain reliable operating conditions. In an example, to meet the reliability in operating conditions, four LSBs and three lower MSBs can be implemented in seven circuit blocks 111.3$_0$ through 111.3$_k$ (triple stack configuration), and seven "middle" MSBs can be implemented in seven circuit blocks 111.2$_0$ through 111.2$_j$ (double stack configuration). The upper five MSBs can be implemented in five circuit blocks 111.1$_0$ through 111.1$_i$ (single stack configuration), to compensate for high resistance of the triple stacks in case of high load currents (e.g., $I_{LOAD}$) when most of transistors T conduct. In the example described herein, circuit blocks 111.3$_0$ through 111.3$_k$ (triple stack) can conduct over the whole range of voltage $V_{DO}$ (e.g., up to 1100 mV). Circuit blocks 111.2$_0$ through 111.2$_j$ (double stack) can be operational up to another voltage (e.g., up to 500 mV). Circuit blocks 111.1$_0$ through 111.1$_i$ (single stack) can be turned off for $V_{DO}$>250 mV.

FIG. 6 also shows layouts (e.g., areas in dashed lines) 611, 612, and 613 of circuit blocks 111.1$_0$ through 111.1$_i$, 111.2$_0$ through 111.2$_i$, and 111.3$_0$ through 111.3$_k$, respectively. In the example of FIG. 6 area 611 (single stack), 612 (double stack), and 613 (triple stack) can be about 15%, 40%, and 45%, respectively, of the total area of power stage 111. These area percentages are example values. The areas of circuit blocks 111.1$_0$ through 111.1$_i$, 111.2$_0$ through 111.2$_j$, and 111.3$_0$ through 1111.3$_k$ may have other relative percentage values.

Figure 7:
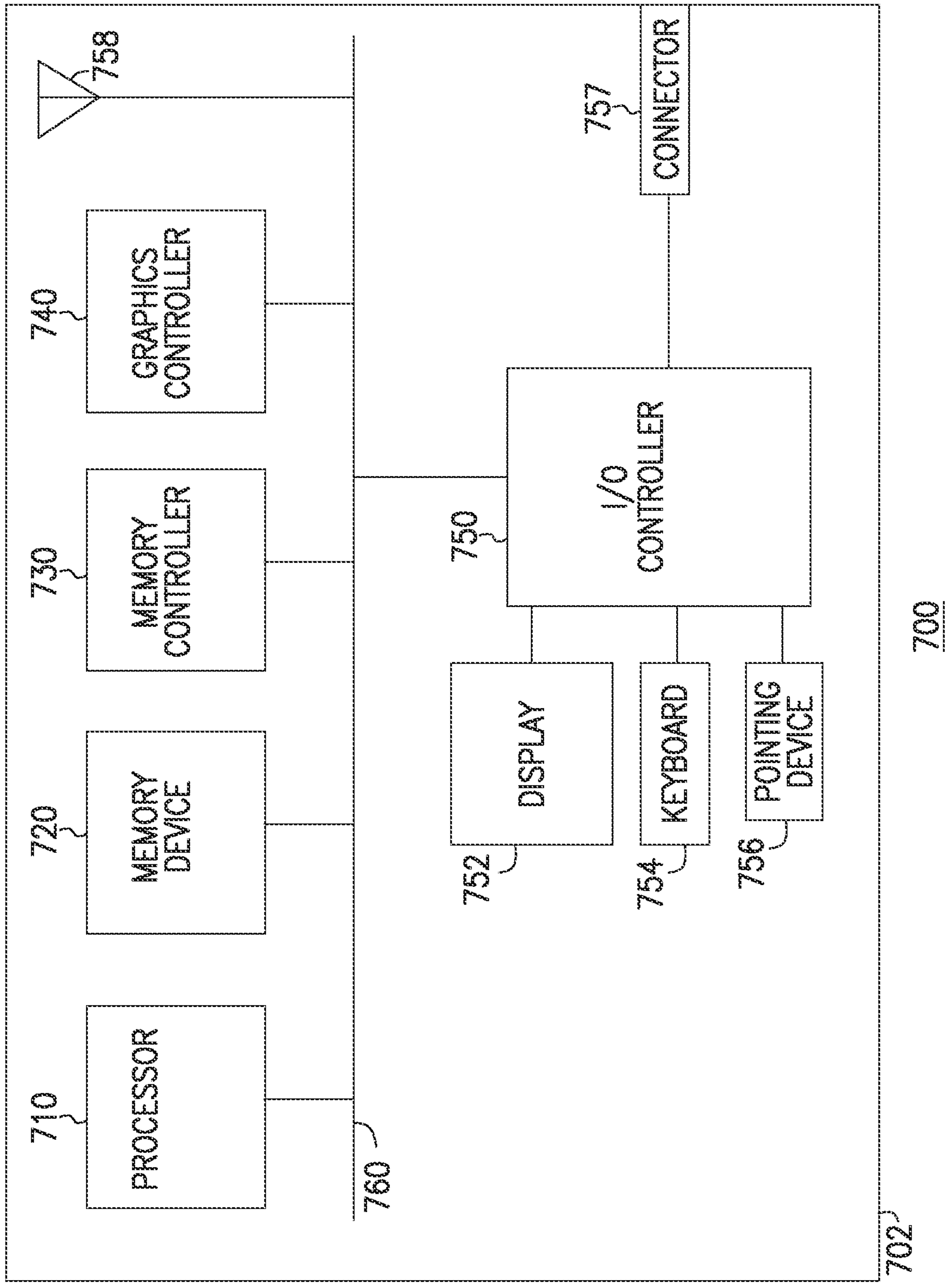
FIG. 7 shows an apparatus in the form of a system (e.g., electronic system), according to some embodiments described herein.

FIG. 7 shows an apparatus in the form of a system (e.g., electronic system) 700, according to some embodiments described herein. System 700 can include or be included in a computer, a tablet, or other electronic system. As shown in FIG. 7, system 700 can include components located on a circuit board (e.g., printed circuit board (PCB)) 702, such as a processor 710, a memory device 720, a memory controller 730, a graphics controller 740, an I/O controller 750, a display 752, a keyboard 754, a pointing device 756, at least one antenna 758, a connector 757, and a bus 760. BUS 760 can include conductive lines (e.g., metal-based traces on a circuit board where the components of system 700 are located).

In some arrangements, system 700 does not have to include a display. Thus, display 752 can be omitted from system 700. In some arrangements, system 700 does not have to include any antenna. Thus, antenna 758 can be omitted from system 700. In some arrangements, system 700 does not have to include a connector. Thus, connector 757 can be omitted from system 700.

Processor 710 can include a general-purpose processor, an application-specific integrated circuit (ASIC), or other kinds of processors. Processor 710 can include a CPU.

Memory device 720 can include a dynamic random-access memory (DRAM) device, a static random-access memory (SRAM) device, a flash memory device, phase change memory, a combination of these memory devices, or other types of memory. FIG. 7 shows an example where memory device 720 is a stand-alone memory device separated from processor 710. In an alternative arrangement, memory device 720 and processor 710 can be located on the same die. In such an alternative arrangement, memory device 720 is an embedded memory in processor 710, such as embedded DRAM (eDRAM), embedded. SRAM (eSRAM), embedded flash memory, or another type of embedded memory.

Display 752 can include a liquid crystal display (LCD), a touchscreen (e.g., capacitive or resistive touchscreen), or another type of display. Pointing device 756 can include a mouse, a stylus, or another type of pointing device.

I/O controller 750 can include a communication module for wired or wireless communication (e.g., communication through one or more antenna 758). Such wireless communication may include communication in accordance with WiFi communication technique, Long Term Evolution Advanced (LTE-A) communication technique, or other communication techniques.

I/O controller 750 can also include a module to allow system 700 to communicate with other devices or systems in accordance with one or more of the following standards or specifications (e.g., I/O standards or specifications), including Universal Serial BUS (USB), DisplayPort (DP), High- Definition Multimedia Interface (HDMI), Thunderbolt, Peripheral Component Interconnect Express (PCIe), Ethernet, and other specifications.

Connector 757 can be arranged (e.g., can include terminals (e.g., pins)) to allow system 700 to be coupled to an external device (or system). This may allow system 700 to communicate (e.g., exchange information) with such a device (or system) through connector 757. Connector 757 and at least a portion of bus 760 can include conductive lines that conform with at least one of USB, DP, HDMI, Thunderbolt, PCIe, Ethernet, and other specifications.

At least one of processor 710, memory device 720, memory controller 730, graphics controller 740, and I/O controller 750 can include voltage regulator 110 and its components (e.g., power stage 111) described above with reference to FIG. 1 through FIG. 6.

FIG. 7 shows the components of system 700 arranged separately from each other as an example. For example, processor 710, memory device 720, memory controller 730, graphics controller 740, and I/O controller 750 can be located on a separate IC (e.g., semiconductor die or an IC chip). In some arrangements, two or more components (e.g., processor 710, memory device 720, graphics controller 740, and I/O controller 750) of system 700 can be located on the same die (e.g., same IC chip) that can be part of a system on chip (SoC), a system in a package (SiP), or other electronic devices or systems.

The illustrations of the apparatuses (e.g., apparatus 100 including voltage regulator 110 and power stage 111) described above with reference to FIG. 1 through FIG. 7 are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, a list of items joined by the term "one of" can mean only one of the listed items. For example, if items A and B are listed, then the phrase "one of A and B" means A only (excluding B), or B only (excluding A). In another example, if items A, B, and C are listed, then the phrase "one of A, B, and C" means A only, only, or C only. Item A can include a single element or multiple elements. Item B can include a single element or multiple elements. Item C can include a single element or multiple elements.

In the detailed description and the claims, a list of items joined by the term "at least one of" can mean any combination of the listed items. For example, if items A and B are listed, then the phrase "at least one of A and B" means A only, B only, or A and B. In another example, if items A, B, and C are listed, then the phrase "at least one of A, B, and C" means A only; B only; C only; A and B (excluding C); A and C (excluding B); B and C (excluding A); or all of A, B, and C. Item A can include a single element or multiple elements. Item B can include a single element or multiple elements. Item C can include a single element or multiple elements.

ADDITIONAL NOTES AND EXAMPLES

Example 1 includes subject matter (such as a device, an electronic apparatus (e.g., circuit, electronic system, or both), or a machine) including a first node in a voltage regulator, a second node in the voltage regulator, and a power stage of the voltage regulator to receive a first voltage from the first node and provide a second voltage at the second node, the power stage including a first circuit path and a second circuit path coupled in parallel with each other between the first and second nodes, the first circuit path including a first number of at least one transistor coupled between the first and second nodes, and the second circuit path including a second number of at least one transistor between the first and second nodes, wherein the first number is unequal to the second number.

In Example 2, the subject matter of Example 1 may optionally include, further comprising a third circuit path coupled in parallel with the first and second circuit paths between the first and second nodes, wherein the third number is unequal to the second number.

In Example 3, the subject matter of Example 2 may optionally include, wherein the first number of least one transistor, the second number of at least one transistor, and the third number of at least one transistor include transistors of a same size.

In Example 4, the subject matter of Example 2 may optionally include, wherein the first number of least one transistor, the second number of at least one transistor, and the third number of at least one transistor include transistors of a same transistor type.

In Example 5, the subject matter of Example 3 may optionally include, wherein the first number of least one transistor, the second number of at least one transistor, and the third number of at least one transistor include transistors, and each of the transistors includes a gate coupled to a non-ground node.

In Example 6, the subject matter of Example 1 may optionally include, wherein the first number of least one transistor, the second number of at least one transistor, and the third number of at least one transistor have a same effective resistance.

In Example 7, the subject matter of Example 1 may optionally include, wherein the first number of least one transistor includes a single transistor, and a current density of the single transistor is greater than a current density of a transistor of the second number of at least one transistor and a current density of a transistor of the third number of at least one transistor.

Example 8 includes subject matter (such as a device, an electronic apparatus (e.g., circuit, electronic system, or both), or a machine) including a first node in a voltage regulator, a second node in the voltage regulator, and a power stage of the voltage regulator to receive a first voltage from the first node and provide a second voltage at the second node, the power stage including a first circuit path and a second circuit path coupled in parallel with each other between the first and second nodes, the first circuit path including a first number of transistors coupled in series between the first and second nodes, the second circuit path including a second number of transistors coupled in series between the first and second nodes, wherein the first number of transistors is unequal to the second number of transistors.

In Example 9, the subject matter of Example 8 may optionally include, wherein the first number of transistors is an odd number.

In Example $1_0$, the subject matter of Example 9 may optionally include, wherein the second number of transistors is an even number.

In Example 11, the subject matter of Example 8 may optionally include, wherein the power stage includes a single transistor coupled between the first and second nodes and coupled in parallel with the first number of transistors and the second number of transistors between the first and second nodes.

In Example 12, the subject matter of Example 8 may optionally include, further comprising a first switch coupled between a non-ground node and a gate of a transistor of the first number of transistors, and a second switch coupled between a non-ground node and a gate of a transistor of the second number of transistors.

In Example 13, the subject matter of Example 12 may optionally include, further comprising control nodes to provide control information to the first and second switches.

In Example 14, the subject matter of Example 13 may optionally include, wherein the control information includes thermometer bits.

In Example 15, the subject matter of Example 13 may optionally include, wherein the control information includes binary bits Example 16 includes subject matter (such as a device, an electronic apparatus (e.g., circuit, electronic system, or both), or a machine) including a first node in a voltage regulator, a second node in the voltage regulator, a first circuit block including first parallel circuit paths between the first and second nodes, each of the first parallel circuit paths including at least one transistor coupled between the first and second nodes, a second circuit block including second parallel circuit paths between the first and second nodes, each of the second parallel circuit paths including transistors coupled in series between the first and second nodes, and a third circuit block including third parallel circuit paths between the first and second nodes, each of the third parallel circuit paths including transistors coupled in series between the first and second nodes, wherein a number of transistors in the second circuit block is $s^2$ where s is a number of series-connected transistors in a circuit path in the second circuit block between the first and second nodes.

In Example 17, the subject matter of Example 16 may optionally include, wherein a number of transistors in the third circuit block is greater the number of transistors in the second circuit block In Example 18, the subject matter of Example 16 may optionally include, further comprising a bias voltage generator to provide a bias voltage to a gate of each of the transistors of the first, second, and third circuit blocks.

In Example 19, the subject matter of Example 16 may optionally include, wherein the transistors of the first, second, and third circuit blocks are structured to have a same gate-to-source voltage.

Example 20 includes subject matter (such as a device, an electronic apparatus (e.g., circuit, electronic system, or both), or a machine) including a processing core, and a digital voltage regulator coupled to the processing core, the digital voltage regulator including a first node to receive a first voltage, a second node to provide a second voltage less than the first voltage, and a power stage coupled to the first and second nodes, the power stage including a first circuit path and second circuit paths coupled in parallel with each other between the first and second nodes, the first circuit path including a single transistor coupled between the first and second nodes, and additional transistors coupled in series between the first and second nodes and coupled in parallel with the single transistor between the first and second node.

In Example 21, the subject matter of Example 20 may optionally include, further comprising a die, wherein the processing core and the digital voltage regulator are included in the die.

In Example 22, the subject matter of Example 20 may optionally include, further comprising a connector coupled to the processing core, the connector conforming with one of Universal Serial BUS (USB), High-Definition Multimedia Interface (HDMI), Thunderbolt, Peripheral Component Interconnect Express (PCIe), and Ethernet specifications.

The subject matter of Example 1 through Example 22 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is a aimed is:

1. An apparatus comprising:

a first node in a voltage regulator;

a second node in the voltage regulator, the second node to provide a regulated output voltage; and a power stage of the voltage regulator to receive a first voltage from the first node and provide a second voltage at the second node, the power stage including a first circuit path, a second circuit path, and a third circuit path coupled in parallel with each other between the first and second nodes, the first circuit path including a first number of at least one transistor coupled between the first and second nodes, the second circuit path including a second number of at least one transistor between the first and second nodes, and the third circuit path including a third number of at least one transistor between the first and second nodes, wherein the first number is unequal to the second number, which is unequal to the third number, wherein the first number of the at least one transistor, the second number of the at least one transistor, and the third number of the at least one transistor include transistors of a same size, and each of the first, second, and third circuit paths include a transistor with a gate coupled to a non-ground node.

2. The apparatus of claim 1, wherein the first number of the at least one transistor, the second number of the at least one transistor, and the third number of the at least one transistor include transistors of a same transistor type.

3. The apparatus of claim 1, wherein the first number of the at least one transistor, the second number of the at least one transistor, and the third number of the at least one transistor have a same effective resistance.

4. The apparatus of claim 1, wherein the first number of the at least one transistor includes a single transistor, and a current density of the single transistor is greater than a current density of a transistor of the second number of the at least one transistor and a current density of a transistor of the third number of the at least one transistor.

5. An apparatus comprising:

a first node in a voltage regulator;

a second node in the voltage regulator; and a power stage of the voltage regulator to receive a first voltage from the first node and provide a second voltage at the second node, the power stage including a first circuit path and a second circuit path coupled in parallel with each other between the first and second nodes, the first circuit path including a first number of transistors coupled in series between the first and second nodes, the second circuit path including a second number of transistors coupled in series between the first and second nodes, wherein the first number of transistors is unequal to the second number of transistors, wherein there is a first switch coupled between a non-ground node and a gate of a transistor of the first number of transistors, and a second switch coupled between a non-ground node and a gate of a transistor of the second number of transistors.

6. The apparatus of claim 5, wherein the first number of transistors is an odd number.

7. The apparatus of claim 6, wherein the second number of transistors is an even number.

8. The apparatus of claim 5, wherein the power stage includes a single transistor coupled between the first and second nodes and coupled in parallel with the first number of transistors and the second number of transistors between the first and second nodes.

9. The apparatus of claim 5, further comprising control nodes to provide control information to the first and second switches.

10. The apparatus of claim 9, wherein the control information includes thermometer bits.

11. The apparatus of claim 9, wherein the control information includes binary bits.

12. An apparatus comprising:

a first node in a voltage regulator;

a second node in the voltage regulator;

a first circuit block including first parallel circuit paths between the first and second nodes, each of the first parallel circuit paths including at least one transistor coupled between the first and second nodes;

a second circuit block including second parallel circuit paths between the first and second nodes, each of the second parallel circuit paths including transistors coupled in series between the first and second nodes; and a third circuit block including third parallel circuit paths between the first and second nodes, each of the third parallel circuit paths including transistors coupled in series between the first and second nodes, wherein a number of transistors in the second circuit block is $s^2$ where s is a number of series-connected transistors in a circuit path in the second circuit block between the first and second nodes.

13. The apparatus of claim 12, wherein a number of transistors in the third circuit block is greater than the number of transistors in the second circuit block.

14. The apparatus of claim 12, further comprising a bias voltage generator to provide a bias voltage to a gate of each of the transistors of the first, second, and third circuit blocks.

15. The apparatus of claim 12, wherein the transistors of the first, second, and third circuit blocks are structured to have a same gate-to-source voltage.

16. An apparatus comprising:

a processing core; and a digital voltage regulator coupled to the processing core, the digital voltage regulator including:

a first node to receive a first voltage;

a second node to provide a second voltage less than the first voltage, the second node to provide a regulated output voltage; and a power stage coupled to the first and second nodes, the power stage including first, second and third circuit paths coupled in parallel between the first and second nodes, wherein the first, second, and third circuit paths include a different number of one or more transistors with at least one of the one or more transistors including a gate coupled to a non-ground node.

17. The apparatus of claim 16, further comprising a die, wherein the processing core and the digital voltage regulator are included in the die.

18. The apparatus of claim 16, further comprising a connector coupled to the processing core, the connector conforming with one of Universal Serial Bus (USB), High-Definition Multimedia Interface (HDMI), Thunderbolt, Peripheral Component Interconnect Express (PCIe), and Ethernet specifications.

* * * * *